March 11, 1930.   E. F. SMITH ET AL   1,750,061
HOUSING STAY AND SUPPORT DEVICE
Filed Feb. 7, 1929
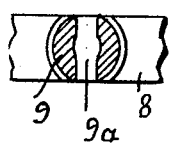
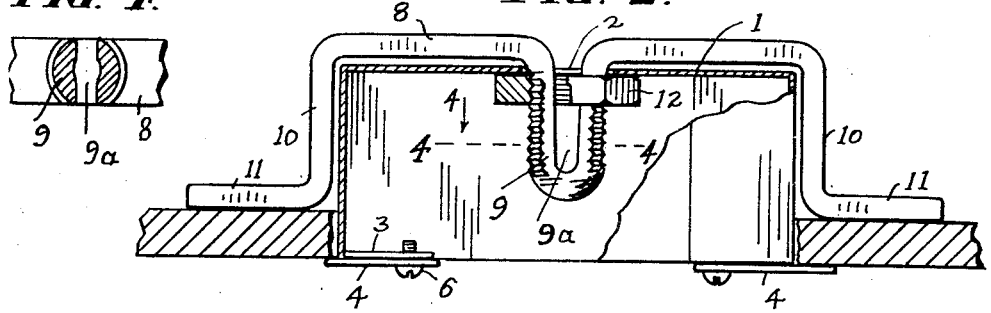
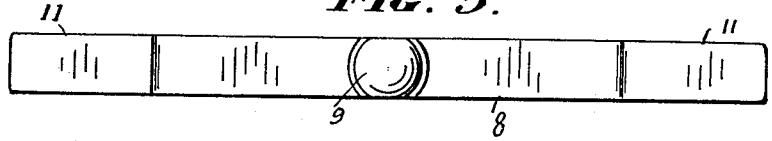
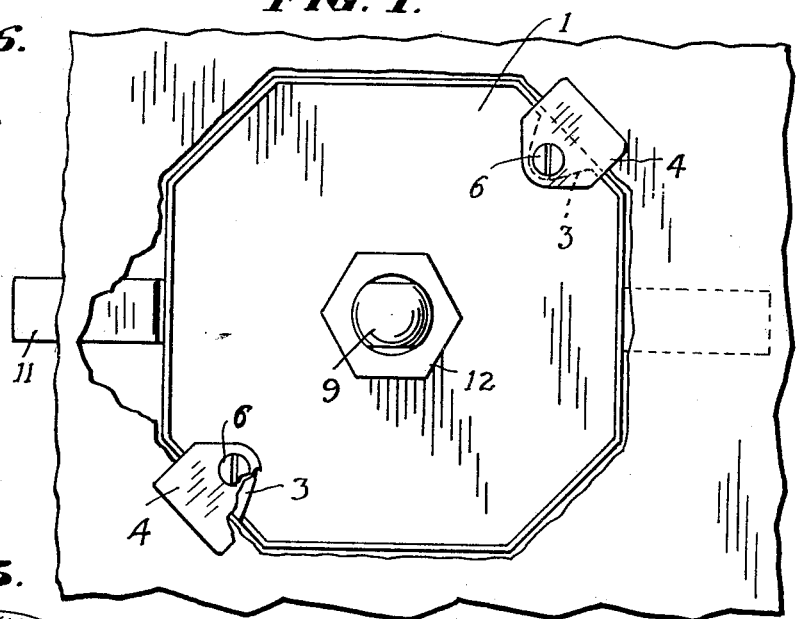
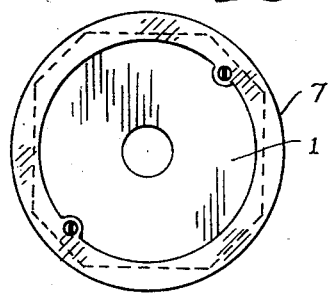
INVENTORS
EARL F. SMITH.
GUY KENNETH WILSON.
BY
ATTORNEY.

Patented Mar. 11, 1930

1,750,061

UNITED STATES PATENT OFFICE

EARL F. SMITH AND GUY KENNETH WILSON, OF MUNCIE, INDIANA, ASSIGNORS TO MIDWEST METAL PRODUCTS COMPANY, OF MUNCIE, INDIANA, A CORPORATION OF INDIANA

HOUSING STAY AND SUPPORT DEVICE

Application filed February 7, 1929. Serial No. 338,127.

In electric wiring installations wherein the well known metal conduit is used, the end of the conduit is brought to proximity with the location intended for the outlet. A metal housing having frontal opening, is secured to such conduit, and thus retained, it constitutes a housing or outlet box for the end portions of the electric wires that protrude from the conduit. By the proper disposing of the conduit, the position of the box, with relation to the plane of the wall or ceiling, may be fixed. The said box is thus available for the attachment thereto, and the support therefrom, of such electric service connections or fixtures as may be desired.

In installations wherein "open wiring" is practiced (in such installations the conduit being not used), there is the problem of providing a suitable outlet and housing for the end portions of the conductors, and for affording a support to which electric service devices, such as electric lighting fixtures, may be attached. The material of which the wall or ceiling is constructed, consists usually of metal or wooden lath, and plaster, or of fiber board, which said materials while being suitable for the purpose intended, are not adapted to receive or retain connections directly, such as screws, nails or bolts. The aforesaid problem is present whether the wiring is installed concurrently with the construction of the building, or whether it may have been installed after the building walls will have been completed.

The object of our invention is to provide a housing and support device, which is capable of being easily and securely installed at any desired location on the wall or ceiling, and which device serves not only the purpose as a housing for the electric wires received therein, but as a support for service attachments such as electric lighting fixtures and the like. Other purposes of the invention are to provide a device of the kind described which is economical of manufacture, strong and durable, and not liable to get out of order or to be the cause of trouble or inconvenience.

The objects of our invention are accomplished by, and the invention is embodied in the new construction, combination and arrangement of parts described in the following specification, and illustrated in the accompanying drawings.

The several parts of the invention are identified by suitable characters of reference applied thereto in the different views in the drawings, in which—

Figure 1 is a front view of our improved housing, stay and support device as it appears when installed. In this view a fragmentary portion of wall board is shown.

Figure 2 is a top plan view of Figure 1, a portion of the housing being shown in cross section.

Figure 3 is a front view of the stay member.

Figure 4 is a cross section view taken on the line 4—4 in Figure 2, and as seen in the direction of arrow 4 in Figure 2.

Figure 5 is a view showing a flange member of modified form.

Figure 6 is a view showing a modified form of housing, the flange member thereof being integral.

Figure 7 is a view of an implement suitable for the purpose of holding the stay member at position while the box is disposed in place.

Our invention contemplates the providing of a housing with open front, and there being an opening provided in its rear portion, a flange on its frontal edge, a stay member having a body portion provided with a stud adapted to protrude through the opening in the rear portion of the housing, and there being legs on said stay member that extend to a plane a distance from the plane of the front of the housing, and means within the housing, operable to draw the housing and stay member toward each other, whereby the legs of the stay member and the flange of the housing are caused to be held in clamping engagement with the rear and frontal surfaces respectively, of the wall structure.

In the present construction, embodying our invention, the housing consists of a sheet metal box of the usual proportions shown, the front thereof being open. This box is about three and five eighths inches in width and one and one half inches in depth, and in the rear side 1 thereof is a usual central opening 2. Opposed integral lugs 3, are inturned, as shown in Figure 1, and each is provided with a threaded hole. A boxing of this type is of standard construction and it lends itself very practicably to the purposes of our invention. In using such box we provide flange plates 4 of the general formation shown in Figure 1, and which are adapted to be secured to the lugs 3, by cap screws 6. In instances wherein the box of the said standard construction having the inturned lugs is not used, we contemplate providing a box provided with integrally formed outwardly disposed flanges.

The said flange plates 4 have their body portions adapted to repose in engagement with the marginal portions of the opening in the wall board when the box is in place. A modified, or one-piece form of flange member, consists of an annular light sheet metal plate 7 adapted to be secured to the lugs of the box, and it is illustrated in Figure 6. The internal diameter of this modified flange member is such as to permit of easy access to the interior of the box.

The stay member consists of a metal bar about one half inch in width and three sixteenths of an inch in thickness. This bar is of predetermined length, the portions thereof at each side of the center being bent in parallelism, thence in opposite directions, thence again in parallelism, and thence again in opposite directions, thereby constituting a body portion 8 having an integrally formed slotted stud 9, the leg portions 10 and 10, and the foot portions 11 and 11. A stay member of the structure and formation just described is capable of being manufactured economically, there being no machine work involved, except a milling, and threading of the stud, for the reception of fittings having standard iron pipe threads, or such other standard threads as may be desired. Adapted to be screwed on the said stud is the nut 12. A feature of this stud is the slot 9ª which is automatically provided therein by the construction just described.

The slot 9ª provides facility for the use of a simple implement adapted to be engaged therewith, and whereby it is practicable to hold the stay member in position with its feet in engagement with the rear face of the wall board, while the box, and the nut, are disposed in place. Another function of the said slot is to provide for the easy insertion into the box, of the electric wires or conductors which are to be received therein.

To install our improved housing, stay and support device, an implement which may consist of a flexible iron or copper wire bent into elongated U shaped formation, as shown in Figure 7, is used. The stay member (the slot of the stud being engaged by the implement) is inserted through the opening provided therefor in the wall board. The user, while retaining the stay member in place by exerting a hold or pull on the implement, (the foot portions 11 and 11 of the stay member being in engagement with the rear face of the wall board) strings the box on the implement and passes it to place in the said opening and adjacent to the stay member, the flange members 4 being in registration with the marginal portions of the wall opening. The nut is then strung on the implement and passed to engagement with the stud and upon which it is screwed, thereby drawing the box and stay member toward each other, and causing the feet 11 and 11, and the flanges 4 and 4 to firmly engage the rear and front faces respectively, of the wall board. The implement may then be removed, by withdrawing it from the stud, or by snipping it off with pliers. The nut may then be further screwed to the desired tightened position.

Whereas the structural features of the stay members are described specifically, it will be understood that modifications may be made as to the formation of the body portion 8, it being practicable to make this portion continuous in structure, and having a slotted and threaded stud united therewith in any suitable manner.

By our invention, a housing is provided for the conductors, which is held securely in position, and without the use of nails or screws, and without mutilation of the wall board. The stud 9 besides affording means of connection between the stay member and the housing, constitutes a support element adapted for the attachment thereto of lighting fixtures or other electric service devices. The slot in the stud provides easy access for the insertion into the box of the electric wires or conductors which are to be received therein, and it also renders practicable the use of an implement of the simple character just described, or of an implement of any kind which may be adapted to engage said slot, and upon which the box and nut may be passed to position.

We are aware that minor changes may be made in the construction and details of our invention, within the scope of same as it is defined in the appended claims, without departing from the principles or spirit of the invention.

What we claim as our invention, and desire to secure by Letters Patent, is:

1. A housing, stay and support device of the kind described, comprising a box having an opening in the rear side thereof and the front of the box being open, a stay member having its body portion to register with the rear, and being provided with footed side portions which register on a plane a distance from the plane of the front of the box, and there being a stud on the body portion of the stay member to extend through the opening in the rear of the box, said stud having an opening therein through which electric wires may be passed, a flange plate on the front of the box, and means on the stud operable to draw the box toward the body portion of the stay member.

2. A housing, stay and support device for electric wiring, comprising a box having open front, and being provided with an opening in its rear side, a stay member having its body portion to register with the rear of the box and being provided with legs whose foot portions register in a plane a distance to the rear of the plane of the front of the box, a stud on the stay member to protrude through the rear of the box and having an opening through which electric wires may be passed into the box, a flange member on the front of the box, and means on the stud operable to draw the box toward and to hold same in engagement with the said stay member.

3. A device of the kind described, comprising a housing with open front, and having an opening in the rear side, a flange on the frontal edge adapted to engage a wall board, a stay member having a body portion provided with a stud to protrude through said opening, and having legs that extend to a plane a distance from the plane of the front of the housing, and means within the housing, operable to draw the housing and stay member toward each other, whereby the legs of the stay member and the flange of the housing are caused to be held in clamping engagement with the wall board.

4. A device of the kind described, comprising a housing with open front, and having an opening in the rear side, a flange on the frontal edge, a stay member having its body portion to register with the rear of the housing, and being provided with legs to extend toward the front, but which are of length less than the depth dimension of the box, a stud on the stay member which is threaded, and is provided with a longitudinal slot, the said stud being adapted to protrude through the rear side of the housing, and a nut screwed on the said stud.

5. A device of the kind described, comprising a housing with open front, and having an opening in the rear side, a flange on the front of the housing, a stay member having its body portion of length to span the housing and being provided with legs that extend toward the plane of the front of the housing, a threaded stud on the body portion of the stay member, and a nut screwed on the said stud.

6. In combination with an electric outlet housing provided with an open front and having an opening in the rear side, a flange on the frontal edge, a metal bar of predetermined length, bent upon iself at a point intermediate its ends, thence at a relatively short distance from said point, being bent in opposite directions, thence at right angles in the direction of and in parallelism with the first named bend, and thence again in opposite directions, thus constituting a stud, a body portion, and footed portions, and the said stud being threaded, through said opening in the rear of the housing, and there being a nut screwed on said stud.

In testimony whereof we affix our signatures.

EARL F. SMITH.
GUY KENNETH WILSON.